No. 819,181. PATENTED MAY 1, 1906.
J. P. STENSTROM.
CONVERTIBLE SPADE AND HOE.
APPLICATION FILED SEPT. 7, 1905.
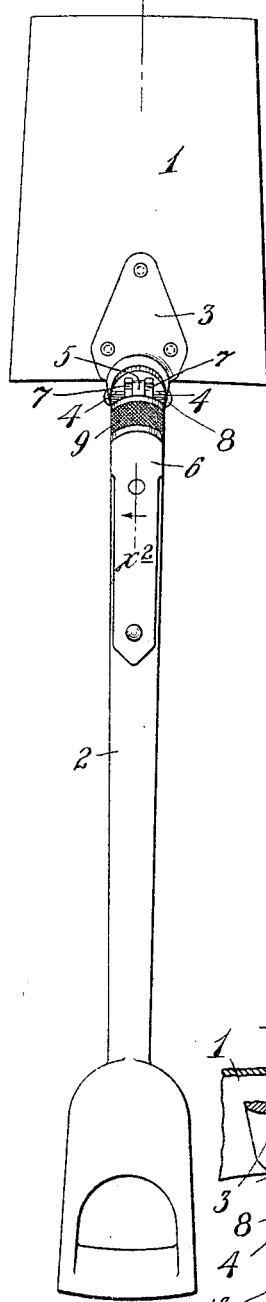
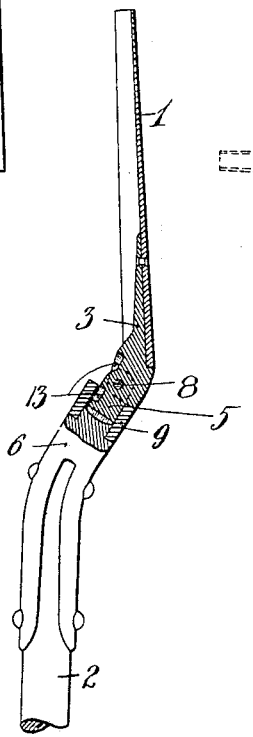
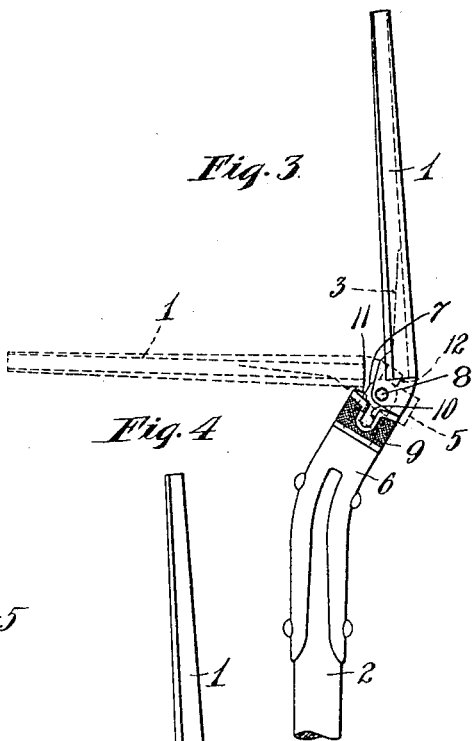
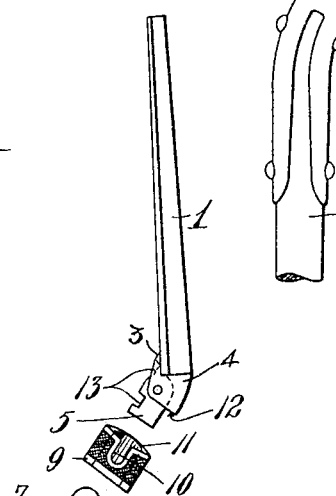
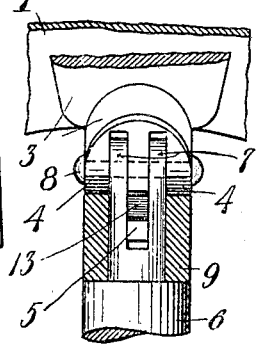
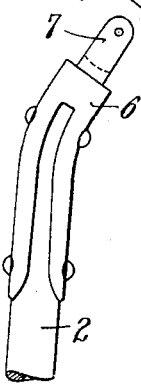
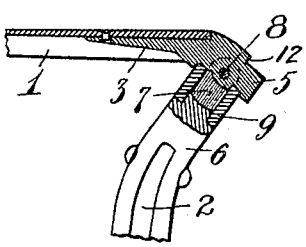
Witnesses.
E. W. Jeppesen
K. D. Kilgore
Inventor:
John P. Stenstrom.
By his Attorneys.
Williamson & Merchant

UNITED STATES PATENT OFFICE.

JOHN P. STENSTROM, OF MORA, MINNESOTA, ASSIGNOR OF ONE-THIRD TO ANTON PETERSON AND ONE-THIRD TO ANDREW M. ANDERSON, OF MORA, MINNESOTA.

CONVERTIBLE SPADE AND HOE.

No. 819,181.     Specification of Letters Patent.     Patented May 1, 1906.

Application filed September 7, 1905. Serial No. 277,355.

*To all whom it may concern:*

Be it known that I, JOHN P. STENSTROM, a citizen of the United States, residing at Mora, in the county of Kanabec and State of Minnesota, have invented certain new and useful Improvements in Convertible Spades and Hoes; and I do hereby declare the following to be a full, clear, and exact description of the invention, such as will enable others skilled in the art to which it appertains to make and use the same.

My invention has for its object to provide a combination spade and hoe; and to this end it consists of the novel devices and combinations of devices hereinafter described and defined in the claim.

The invention is illustrated in the accompanying drawings, wherein like characters indicate like parts throughout the several views.

Figure 1 is a plan view showing the device with its blade adjusted for use as a spade. Fig. 2 is a view, partly in side elevation and partly in section, on the line $x^2$ $x^2$ of Fig. 1, some parts being broken away. Fig. 3 is a side elevation of the device with its blade shown by full lines adjusted for use as a spade and shown by dotted lines as adjusted for use as a hoe, some parts being broken away. Fig. 4 is a side elevation of the parts shown in Fig. 3, but showing the said parts separated. Fig. 5 is a view corresponding to Fig. 2, but with the device adjusted for use as a hoe; and Fig. 6 is an enlarged view, partly in plan and partly in horizontal section, showing the construction of the connection between the blade and the handle.

The numeral 1 indicates the blade, and the numeral 2 the handle, of the device, the said two parts being pivotally connected and being combined with means for locking the blade in either of its two positions.

Referring in detail to the connection between the said parts, the numeral 3 indicates a flanged socket which is riveted or otherwise rigidly secured to the blade and is provided with three laterally-spaced lugs 4, 4, and 5, the latter of which is centrally located and is much longer than the other two.

The handle 2 has secured to its lower end a metallic socket 6, that is formed with the bifurcated trunnion or stub 7, the prongs of which embrace the central lug 5 of the member 3 and are attached to the three lugs thereof by a pin or bolt 8.

Rotatively mounted on the trunnion 7 is a lock-ring 9, that is formed in one side with an open notch 10 and is beveled at one end to form a cam-surface 11. Below the three lugs 4, 4, and 5 the socket member 3 is formed with a bearing-shoulder 12. The front edge of lug 5 is shown to have depressed bearing-surfaces 13 near its ends equidistant from the pivot-hole.

The relation of the parts described is such that when the blade 1 is turned into the position shown in Figs. 1 and 2 and by full lines in Fig. 3 and the lock-ring 9 is turned so that its notch 10 is out of line with the front edge of the central lug 5 it will lock the said lug 5, and hence the blade 1, against the pivotal movements with respect to the handle 2. Also the construction is such that when the lock-ring 9 is turned aproximately as shown by full lines in Fig. 3 its cam-surface 11 will press against the shoulder 12 of the socket member 3, thereby tightly wedging said ring between said shoulder 12 and the shoulder at the junction of the trunnion 7 with the socket member 6, and thereby lock the said ring against accidental movements and also take up all play between the parts.

When it is desired to turn the blade into the position shown by dotted lines in Fig. 3, the lock-ring 9 is turned so that its notch 10 will register with the back edge of the lug 5, thereby permitting said lock to pass through said notch and permit the blade to be turned into its said dotted-line position, Fig. 3, and full-line position, Fig. 5. To lock the said blade in this position, the lock-ring is then again turned with its notch 10 out of line with the long lug 5, thereby causing its cam-surface 11 to engage the two bearing-surfaces 13 of said lug, and thereby locking the blade in said position and securing said lock-ring frictionally against accidental movements.

The utility of a convertible spade and hoe of the character above described is too obvious to require much comment. There are of course many classes of work which may be more conveniently accomplished with the blade turned into an angular position or approximately at a right angle to the handle. The device when thus adjusted is the one designated as a "hoe" and may be used after the manner of a "hoe," but will be found especially serviceable when heavy hoeing is required and for other work, such as truing up vertical embankments and like work.

It will of course be within the scope of my invention to apply a fork to a handle by the means above described or by the use of similar devices.

What I claim, and desire to secure by Letters Patent of the United States, is as follows:

The combination with a handle 2 having a bifurcated trunnion 7, of a blade 1 having a socket member formed with the outside hinged lugs 4 and the centrally-located relatively long lug 5 pivotally connected to said bifurcated trunnion 7, the said lug 5 working between the prongs thereof, and the lock-ring 9 having a notch 10 and cam-surface 11, which ring is mounted on said trunnion 7 and operates on said lug 5 to lock said blade in either of its two positions, and which cam-surface 11 coöperates with bearing-surfaces carried by said blade to frictionally hold said ring in its locked position, substantially as described.

In testimony whereof I affix my signature in presence of two witnesses.

JOHN P. STENSTROM.

Witnesses:
   W. S. SOUTHWICK,
   CLARA M. KOLSRUD.